(12) United States Patent
Hooper et al.

(10) Patent No.: US 8,800,582 B2
(45) Date of Patent: Aug. 12, 2014

(54) STORABLE EXTERIOR LIFT COVER

(75) Inventors: Adam C. Hooper, Watertown, WI (US); Timothy J. Dexter, Orland, CA (US); Andrew A. Bayer, Oconomowoc, WI (US)

(73) Assignee: Bruno Independent Living Aids, Inc., Oconomowoc, WI (US)

( * ) Notice: Subject to any disclaimer, the term of this patent is extended or adjusted under 35 U.S.C. 154(b) by 325 days.

(21) Appl. No.: 13/297,083

(22) Filed: Nov. 15, 2011

(65) Prior Publication Data

US 2012/0118341 A1    May 17, 2012

Related U.S. Application Data

(60) Provisional application No. 61/414,269, filed on Nov. 16, 2010.

(51) Int. Cl.
*E04H 15/06* (2006.01)
*B60P 9/00* (2006.01)

(52) U.S. Cl.
USPC ....... 135/88.08; 135/96; 135/120.4; 414/462; 296/163

(58) Field of Classification Search
CPC ..................................................... E04H 15/06
USPC ............ 135/88.01, 88.08, 88.1, 88.13, 88.15, 135/96, 132, 115, 119, 120.4, 912; 414/162, 465, 495, 543, 921, 62, 4; 296/153, 163, 168, 187.13; 224/495, 224/502, 499, 524, 527
See application file for complete search history.

(56) References Cited

U.S. PATENT DOCUMENTS

| | | | | |
|---|---|---|---|---|
| 4,088,363 A | * | 5/1978 | Palmer | 296/161 |
| 4,830,036 A | * | 5/1989 | Sanders | 135/88.17 |
| 5,375,902 A | * | 12/1994 | Church | 296/169 |
| 5,419,607 A | * | 5/1995 | Oliveira | 296/159 |
| 5,720,312 A | * | 2/1998 | Scheuermann | 135/88.09 |
| 5,752,736 A | * | 5/1998 | Nodier | 296/100.18 |
| 5,829,775 A | | 11/1998 | Maxwell et al. | |
| 6,092,856 A | * | 7/2000 | Ladensack | 296/100.11 |
| 6,488,329 B1 | * | 12/2002 | Smith | 296/100.07 |
| 6,802,327 B2 | * | 10/2004 | Koss | 135/88.08 |
| 7,785,058 B2 | * | 8/2010 | Ray | 414/462 |
| 2003/0156930 A1 | * | 8/2003 | Ahedo, Jr. | 414/462 |
| 2006/0107983 A1 | * | 5/2006 | Froncek | 135/88.15 |
| 2007/0280807 A1 | * | 12/2007 | Threet et al. | 414/462 |

OTHER PUBLICATIONS

Discount Ramps—Webpages pertaining to "Heavy Duty Scooter and Wheelchair Covers"—No Publication Date Indicated (7 pgs).
Diestco—Webpages pertaining to "Covers"—No Publication Date Indicated (7 pgs).
Harmar—Webpage pertaining to "Harmar Covers"—No Publication Date Indicated (1 pg).

* cited by examiner

*Primary Examiner* — Winnie Yip
(74) *Attorney, Agent, or Firm* — K&L Gates LLP

(57) ABSTRACT

Storable exterior lift cover systems, apparatus, devices, methods, etc. are configured to be used with a lift device or the like (such as an exterior lift that raises, transports, stores and lowers mobility devices like scooters, power chairs and the like) mounted to a motor vehicle using a trailer hitch or the like. A covering apparatus has a foldable frame that can be unfolded to allow a pliable cover to extend over the lift platform and any cargo. Retraction of the cover and folding of the frame compactly configures and stores the cover apparatus, for example between the lift platform and a motor vehicle to which the lift is secured. Embodiments of the storable exterior lift cover permit easy deployment and storage of a cover that can be reliably transported externally in its deployed or stored configuration.

16 Claims, 15 Drawing Sheets

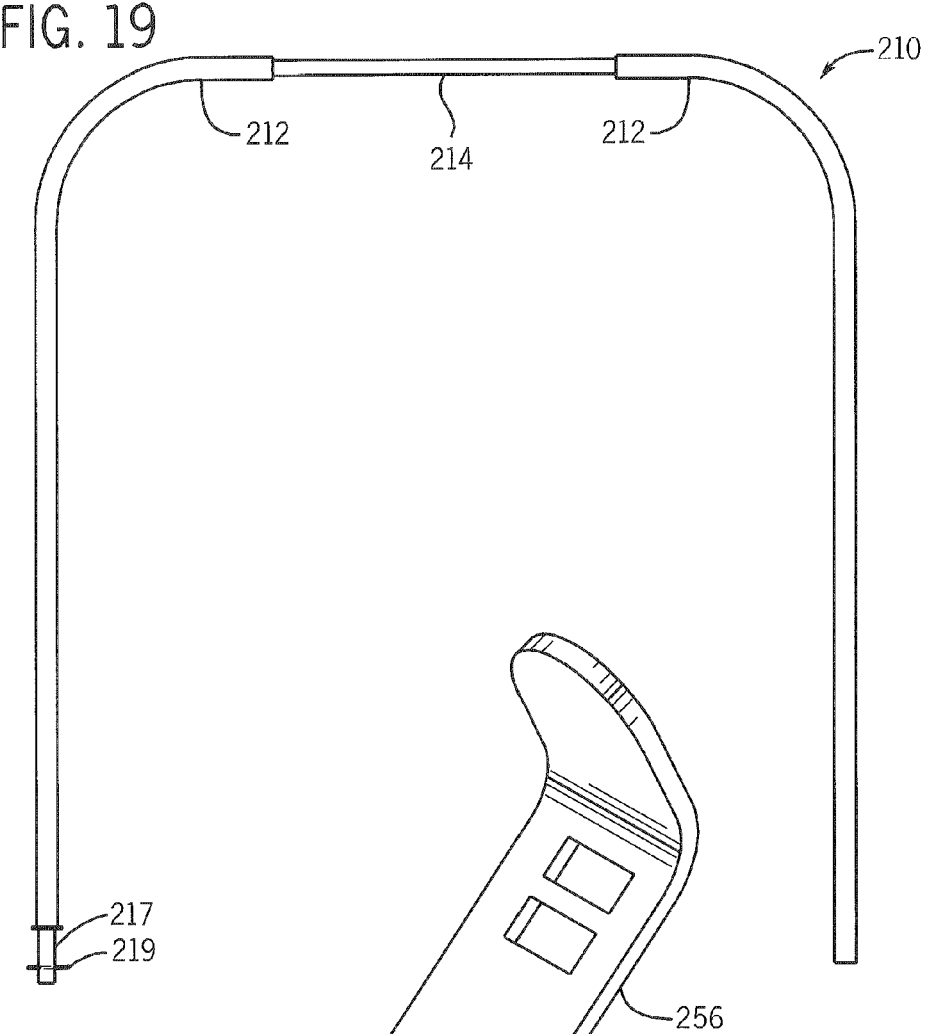
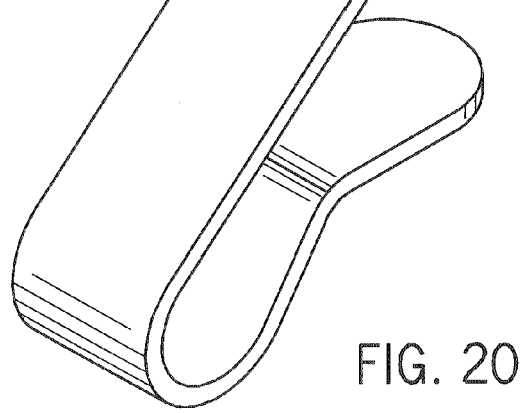

STORABLE EXTERIOR LIFT COVER

PRIORITY CLAIM AND CROSS-REFERENCE TO RELATED APPLICATIONS

This application claims priority to and the benefit of the following prior filed co-pending application:

U.S. Ser. No. 61/414,269 filed Nov. 16, 2010, entitled STORABLE EXTERIOR LIFT COVER. The entire disclosure of any application above is incorporated herein by reference in its entirety for all purposes

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

This invention relates generally to apparatus, systems, methods, techniques, etc. for protecting and covering an exterior lift device on a motor vehicle or the like, including any cargo such as a personal mobility vehicle on the lift device. Several embodiments specifically address covering means that are easily and quickly deployed when needed and stored when not in use.

2. Description of Related Art

Motor vehicles can have lifts affixed to the motor vehicle exterior to support a personal mobility vehicle (PMV) while it is stored and/or transported using the motor vehicle. These exterior lifts and cargo loaded thereon are typically exposed to weather, road debris, etc. while in use. Apparatus, systems, methods, techniques, etc. that provide improved protection of PMVs with easy and quick deployment and storage would represent a significant advancement in the art.

SUMMARY

The present invention is readily understood by the following detailed description in conjunction with the accompanying drawings and appendices. Embodiments of the present invention include storable exterior lift cover systems, apparatus, devices, methods, etc. a lift device (such as an exterior lift used to raise, transport, store and lower mobility devices like scooters, power chairs and the like) is mounted to a motor vehicle using a trailer hitch or the like. To aid in protecting the lift and any cargo thereon, a covering apparatus is provided that uses a foldable frame that can be unfolded into an open configuration that allows a fabric or other pliable material cover to be extended over the lift platform and any cargo. The retraction of the cover and folding of the frame allow the cover apparatus to be compactly configured and stored, for example in a space between the lift platform and a motor vehicle to which the lift is secured. Embodiments of the present invention thus permit easily deployed and stored configurations of a cover that can be transported externally in its deployed or stored configuration.

BRIEF DESCRIPTION OF THE DRAWINGS

Embodiments of the present invention will be readily understood by the following detailed description in conjunction with the accompanying drawings, wherein like reference numerals designate like structural elements, and in which:

FIG. 19 shows one or more embodiments of a foldable frame.

FIG. 20 shows one or more embodiments of a mounting hook.

DETAILED DESCRIPTION

Figure 1:
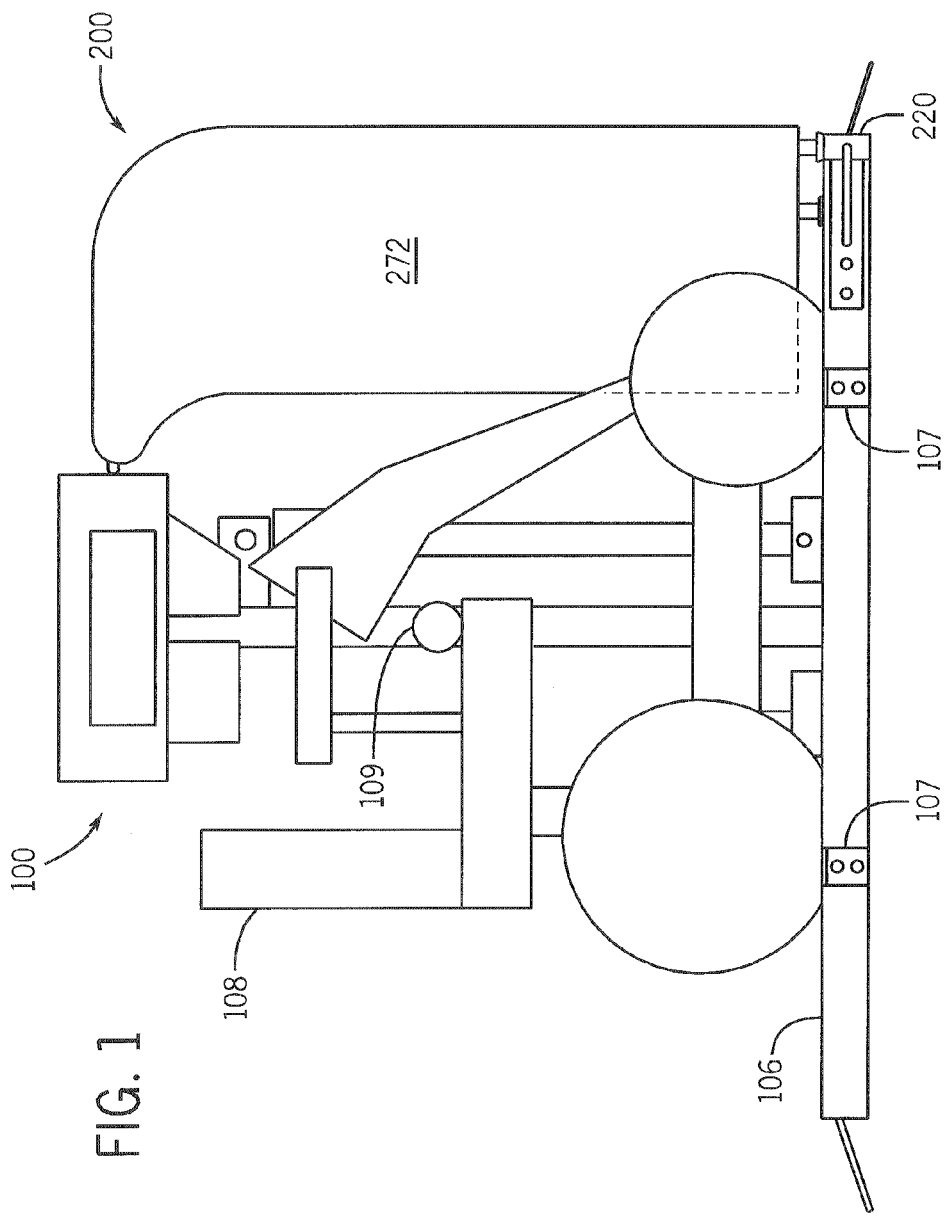
FIGS. 1 and 2 are side views of one or more embodiments of a storable exterior lift cover in its storage configuration with a jacket.

The following detailed description of the invention, including the Figures, will refer to one or more invention embodiments, but is not limited to such embodiments. Rather, the detailed description is intended only to be illustrative. Those skilled in the art will readily appreciate that the detailed description given with respect to the Figures is provided for explanatory purposes as the invention extends beyond such specific embodiments. Embodiments of the invention provide apparatus, systems, methods, techniques, etc. including and pertaining to (but not limited to) covering apparatus for exterior lift devices on motor vehicles and the like. For example, in connection with a motor vehicle having a personal mobility vehicle lift secured to a trailer hitch or the like, a pliable material cover and associated support structure according to one or more embodiments of a storable exterior lift cover system can protect the exterior lift device when the cover is deployed, and can be folded and stored in space between the motor vehicle and lift platform adjacent to the lift when in a stored configuration. Other structures and uses will be apparent to those skilled in the art after considering the following disclosure and the Figures provided herewith.

Embodiments of a storable exterior lift cover system will be shown and explained primarily in connection with a fabric (or other pliable material) cover and a foldable or otherwise collapsible supporting frame that are attachable to the lift or lift platform of an exterior lift configured to be or actually secured to a motor vehicle, the exterior lift being of the type made and sold by Bruno Independent Living Aids, Inc. of Oconomowoc, Wis., and/or other companies. Some embodiments can be used in connection with a motor vehicle having a conventional receiver hitch socket or the like. A variety of mobility device lifts can be used from any of a number of manufacturers. Embodiments of a storable exterior lift cover system herein can replace the earlier covers used for covering lift devices and their cargo that have resembled outdoor barbecue grill covers that do not provide suitable reliability, nor the ease of deployment and storage provided by embodiments described and claimed herein.

As seen in exemplary embodiments shown in the Figures, an exterior vehicle lift 100 is secured to a motor vehicle 500, such as a car, SUV, truck, etc., using a mounting apparatus 102 secured to a receiver hitch socket 502. The exterior lift mounting apparatus 102 is coupled to a lifting mechanism 104, for example an electric, motor-driven actuator or the like, or a non-powered, exterior mobility lift/carrier. The lifting mechanism 104 raises and lowers a platform 106 that can hold a personal mobility vehicle (PMV) 108 or other cargo. Platform 106 is frequently a generally planar metal support onto and off of which the PMV 108 or other cargo can be driven or moved.

Embodiments of a storable exterior lift cover can include a storable exterior lift device covering apparatus 200 used to protect cargo on a platform 106. Covering apparatus 200 can include a foldable frame 210, an outboard mounting structure 220 mounted to platform 106, an inboard mounting structure 230 mounted to the mast of lift device 100 (see, e.g., FIGS. 6 and 21, where the structure 230 is mounted to a lift actuator 104 or the like), a vertical end-sheet assembly 240, and a top-sheet assembly 250. The covering apparatus 200 is in its fully deployed configuration when foldable frame 210 is in its open configuration (e.g., FIGS. 6-12) and the top-sheet cover assembly 250 is in its extended covering configuration (e.g., FIGS. 10-12). The covering apparatus 200 is in its storage configuration when the frame 210 is in its folded configuration (e.g., FIGS. 1-3) and the top-sheet cover assembly is in its retracted storage configuration.

When fully deployed, the covering apparatus 200 securely covers a PMV 108 on platform 106. When in its storage configuration, covering apparatus 200 is folded and maintained in the space (sometimes referred to as "dead space") between motor vehicle 500 and platform 106, out of the way of the PMV for loading and unloading and consistent with raising and lowering of platform 106 on lift 100. The covering apparatus 200 in some embodiments illustrated in the Figures and discussed below must be secured in a manner that allows platform 106 to fold when no PMV is loaded on platform 106 (in some cases a lift device platform will fold nearly 90° when not carrying cargo), but also will "travel with" the platform 106 to keep a loaded PMV 108 covered when the platform is in different vertical positions. Other specifics of this and other embodiments of a storable exterior lift cover system are described in more detail below.

In the embodiments of a storable exterior lift cover system shown in the Figures, covering apparatus 200 has been mounted to platform 106. For purposes of this description, the term "inboard" will refer to the edge of the lift platform 106 that is closest to the motor vehicle 500. Likewise, the term "outboard" will refer to the edge of the lift platform 106 that is farthest from the rear end of the motor vehicle 500. Moreover, the "driver side" edge of platform 106 is the edge that runs generally parallel to the driver side of motor vehicle 500 and the "passenger side" edge of platform 106 is the edge that runs generally parallel to the passenger side of motor vehicle 500. The frame 210 of covering apparatus 200 in the Figures' exemplary embodiments is mounted adjacent to the passenger side edge of platform 106 using outboard mounting structure 220 and an inboard mounting structure 230.

Figure 2:
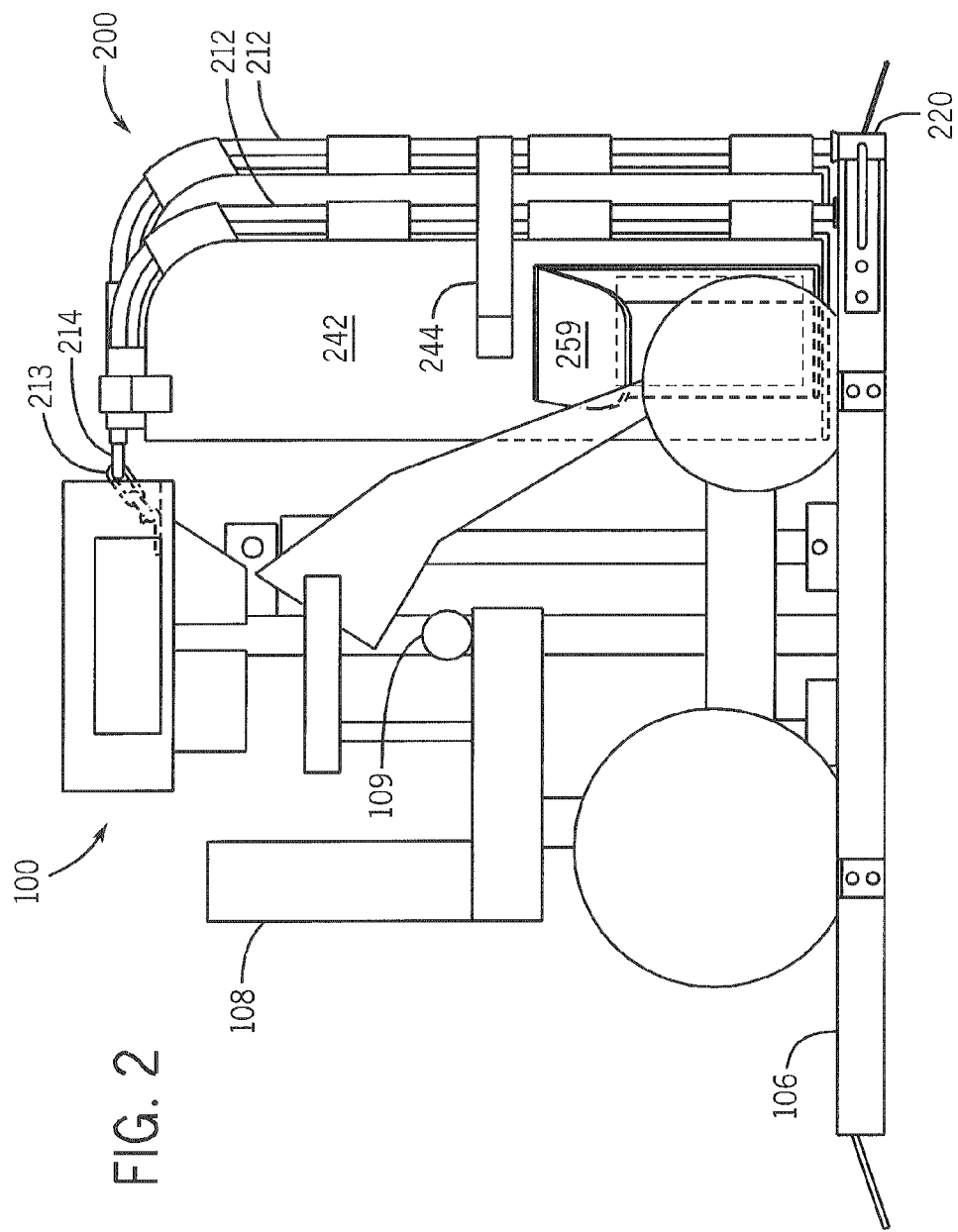
Figure 8:
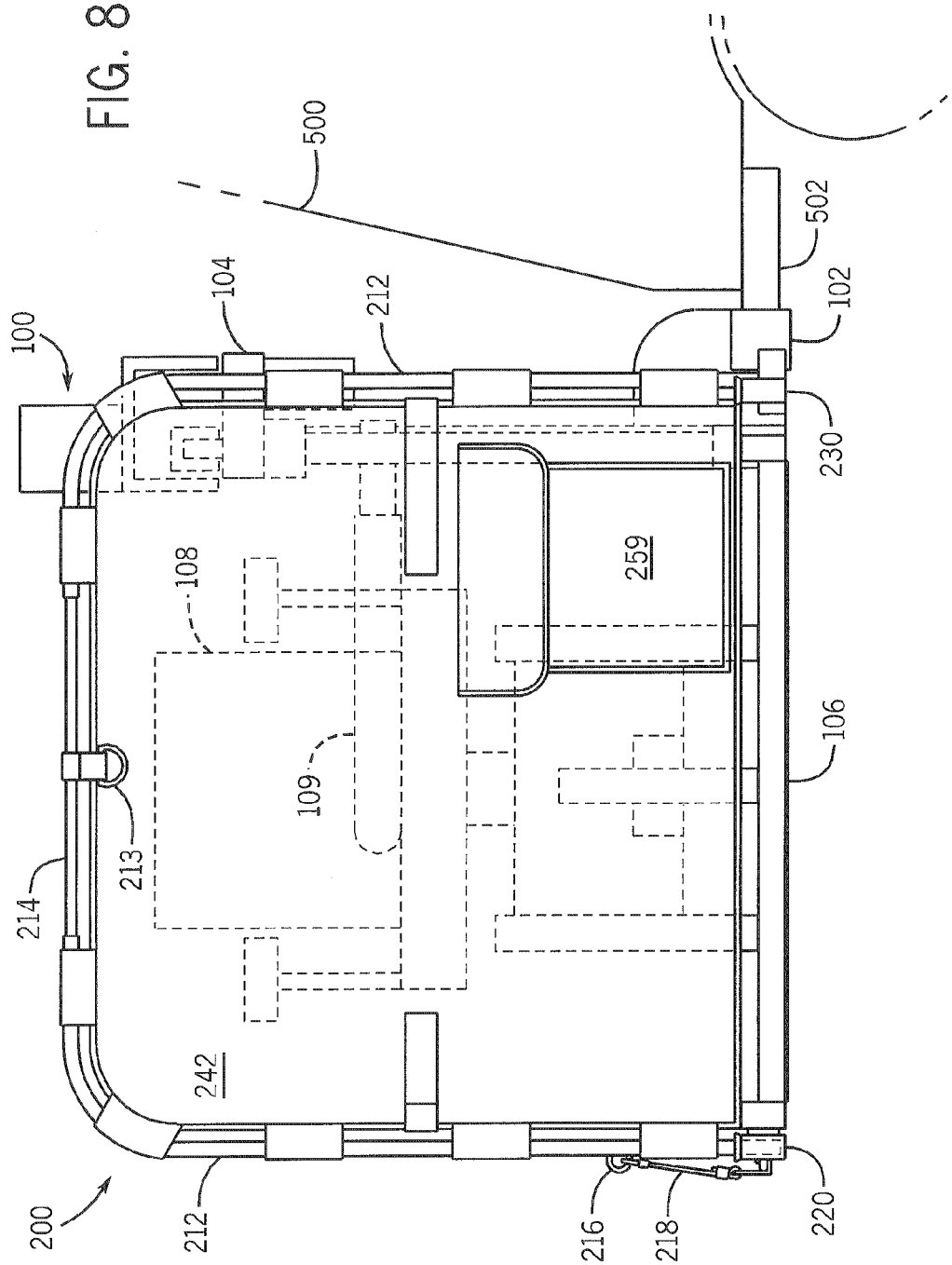
FIG. 8 is an end view of one or more embodiments of a storable exterior lift cover with a frame in its open configuration and the top-sheet cover assembly in its retracted storage configuration.
Figure 9:
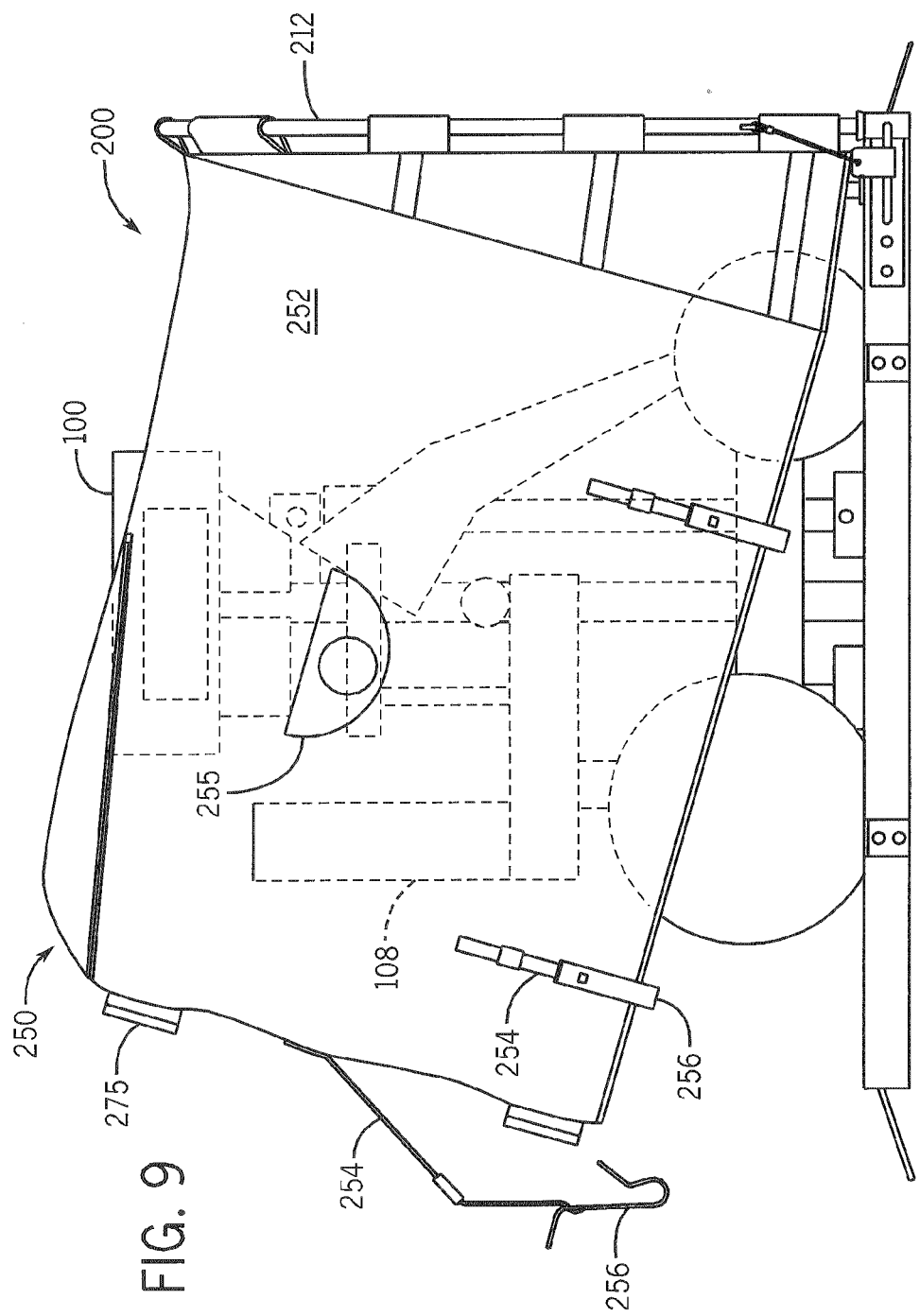
FIG. 9 is a side view of one or more embodiments of a storable exterior lift cover with a frame in its open configuration and the top-sheet cover being extended to cover a platform and cargo thereon.

As illustrated in FIGS. 2, 8 and 19, foldable frame 210 includes two inverted-L-shaped supports 212 that can be made of steel tubing or any other suitable material. In addition to or in lieu of folding, frame 210 may be otherwise "collapsible" to allow for a more compact storage configuration. The dimensions and other physical attributes of supports 212 may be dictated by the intended cargo and use conditions for a given embodiment of a storable exterior lift cover, as will be appreciated by those skilled in the art. The upper ends of supports 212 are connected using a flexible connector 214, which may be elastic as well. Connector 214 maintains a suitable tension between the upper ends of supports 212 when deployed to cover a PMV or other cargo on a platform 106.

Figure 21:
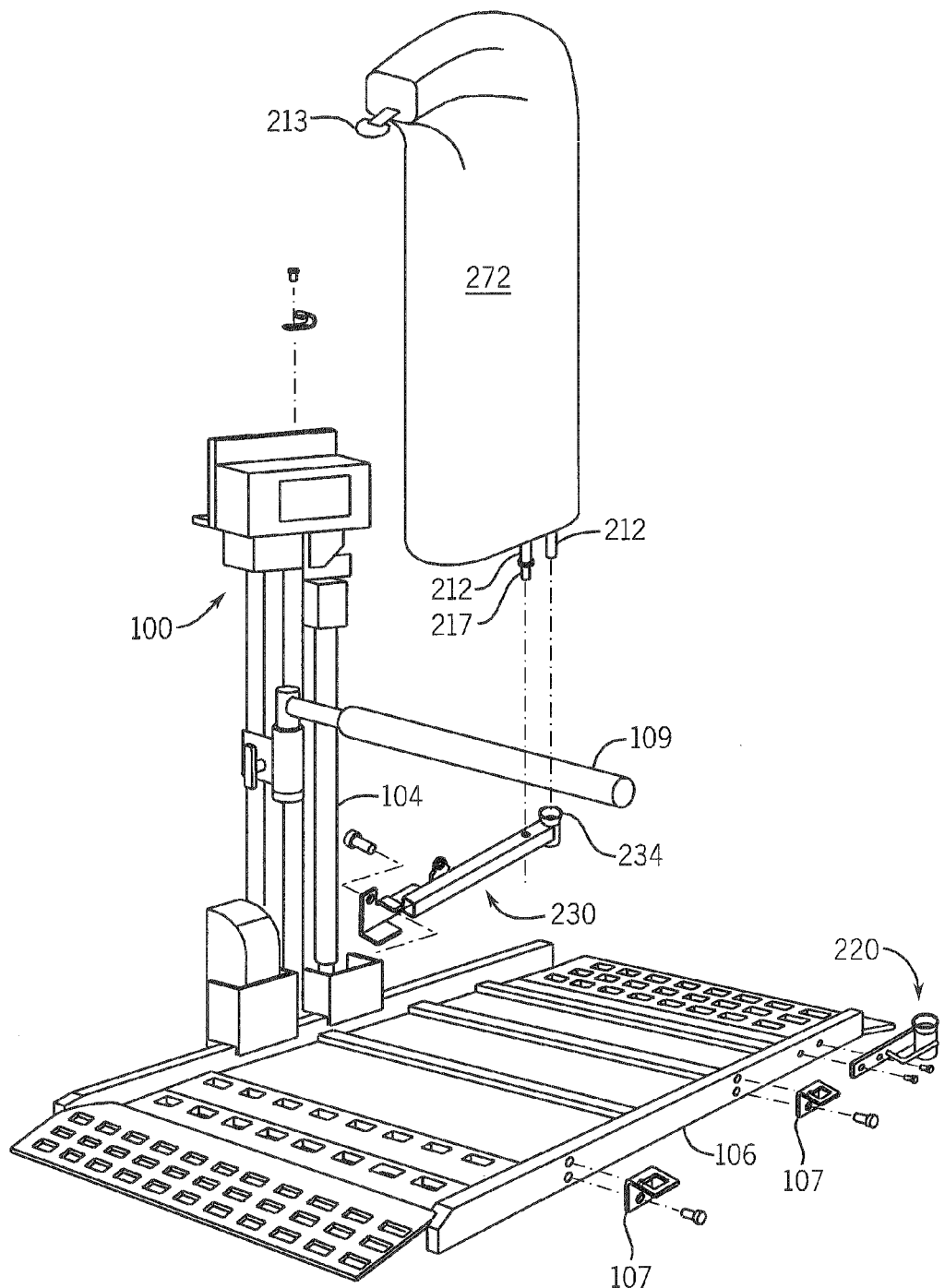
FIG. 21 is an exploded view of one or more embodiments of a storable exterior lift cover.

Connector 214 can be made of suitable material(s), for example flexible rubber hosing with an extension spring held internally within the hosing (for example, attached using a stored energy hinge device such as a coiled extension spring of predetermined size, shape and initial tension). When the covering apparatus 200 is being stored, the flexibility of connector 214 permits "folding" of frame 210 (as depicted, e.g., in FIGS. 3-6) to reduce the frame's size, to allow end-sheet cover 240 to generally enclose and hold the top-sheet cover assembly 250 (see, e.g., FIGS. 2-4), and to permit storage in the space adjacent motor vehicle 500. Connector 214 can be secured to lift device 100 in some embodiments using appropriate anchoring means, such as a D-ring 213 shown in FIG. 21 that can be coupled to the mast of lift device 100 with an elastic strap—this prevents the stored cover from swinging around to block a taillight, for example (a similar D-ring also can be provided on jacket 272 in some embodiments, as seen in FIG. 21). As seen in FIGS. 4-7, supports 212 may have eyelets 216 that allow connection of the supports 212 to one of the mounting structures 220, 230 used to secure frame 210 to a platform 106, as described in more detail below, for example using a bungee connector 218.

As shown in FIGS. 4-6 and 16, outboard mounting structure 220 is affixed to support frame 210 and has an outer cup support bracket 222 to which is welded a rod handle 224 and an outboard socket cup 226. Rod handle 224 can be used for multiple purposes, for example as an anchoring point for a bungee connector 218, for one of the tie-down straps of the platform 106 (used to hold a PMV or other cargo in place on platform 106), etc. The outboard mounting structure 220 can be screwed, bolted, welded or otherwise affixed to or near the outer edge of the platform 106 using outer cup support bracket 222.

Figure 15:
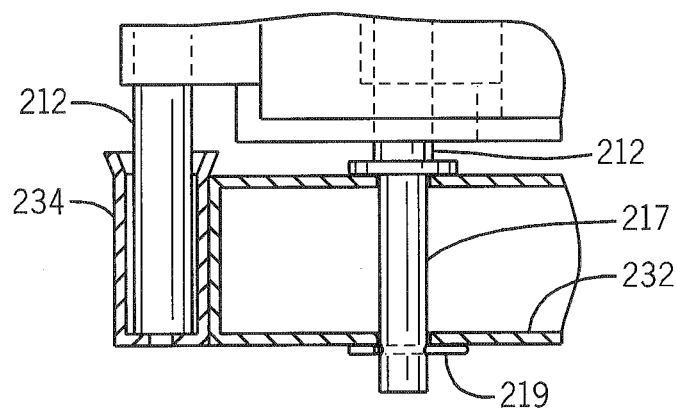
FIG. 15 is a cross-sectional view of a storable exterior lift cover taken along the line 15—15 of FIG. 11.
Figure 16:
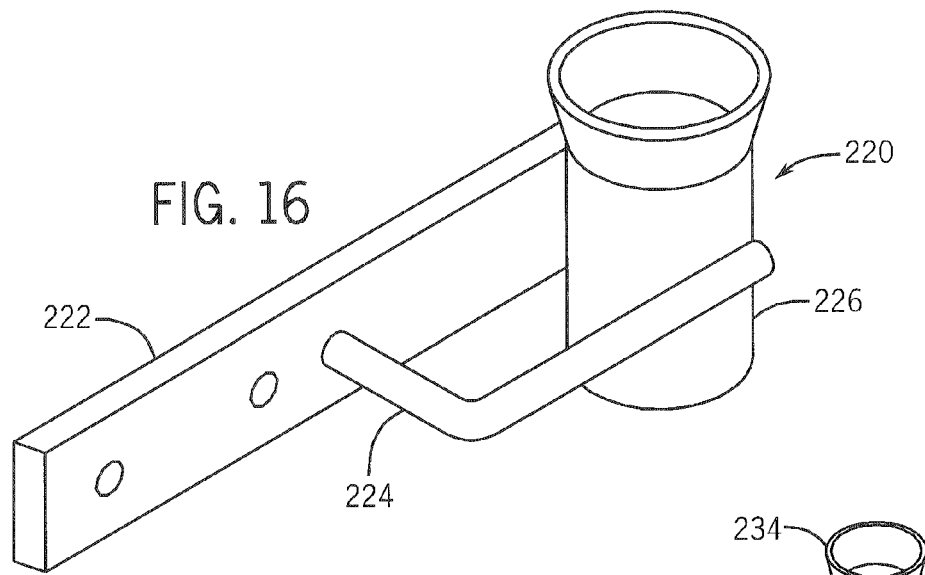
FIG. 16 shows one or more embodiments of an outboard mounting structure.
Figure 17:
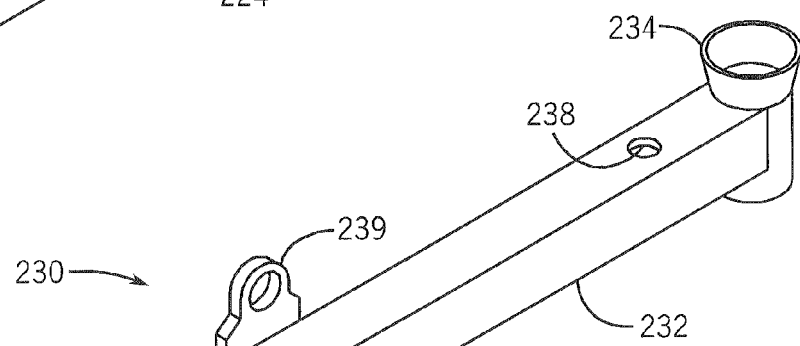
FIG. 17 shows one or more embodiments of an inboard mounting structure.
Figure 18:
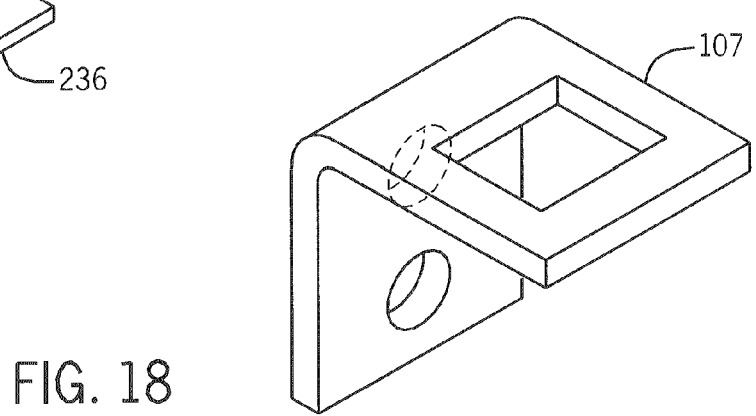
FIG. 18 shows one or more embodiments of a hook anchor bracket.

As shown in FIGS. 4-6 and 17, inboard mounting structure 230 is affixed to lift device 100 using appropriate means and has a main support 232 that includes a formed mounting bracket 236 at one end (for securing to the lift device 100 or the like) and a socket cup 234 mounted at the other end. Bracket 236 can be used to secure (e.g., by welding, screwing, bolting, etc.) the inner mounting structure 230 to or near the inner edge of the platform 106 in embodiments where the platform 106 does not fold up or otherwise dramatically change orientation during normal use. In other embodiments, inboard mounting structure 230 is mounted to a lower actuator bolt on the lift 100 because this can be done using a single configuration for inboard bracket 236 in cases where different configurations for platform 106 might be encountered. Adjacent the inboard frame mounting cup 234 is a frame support hole 238, which provides a swivel or pivot support for a post 217 mounted at the bottom of the inboard frame support 212. As shown in more detail in FIG. 15, post 217 can provide a stable, low-friction pivot when engaged in frame support hole 238 (and held in position by a manually securable mounting mechanism, e.g., by a cotter pin 219 or the like) for the end-sheet portion of the cover system when it is extended to be deployed and when it is folded to be stored. A strap tab 239 can be provided to permit securing the top-sheet cover 250 and/or frame 210 to the inboard mounting structure 230. All of the components of the inboard and outboard mounting structures 230, 220 can be made of suitable material(s) such as steel. Socket cups 226, 234 are of sufficient height and strength to rigidly support frame 210 when in its deployed configuration as well as when the covering apparatus 200 is in its stored configuration. Moreover, cups 226, 234 can have a flared upper opening to facilitate insertion of frame 210 into a cup by an individual having limited dexterity and/or eyesight.

Figure 3:
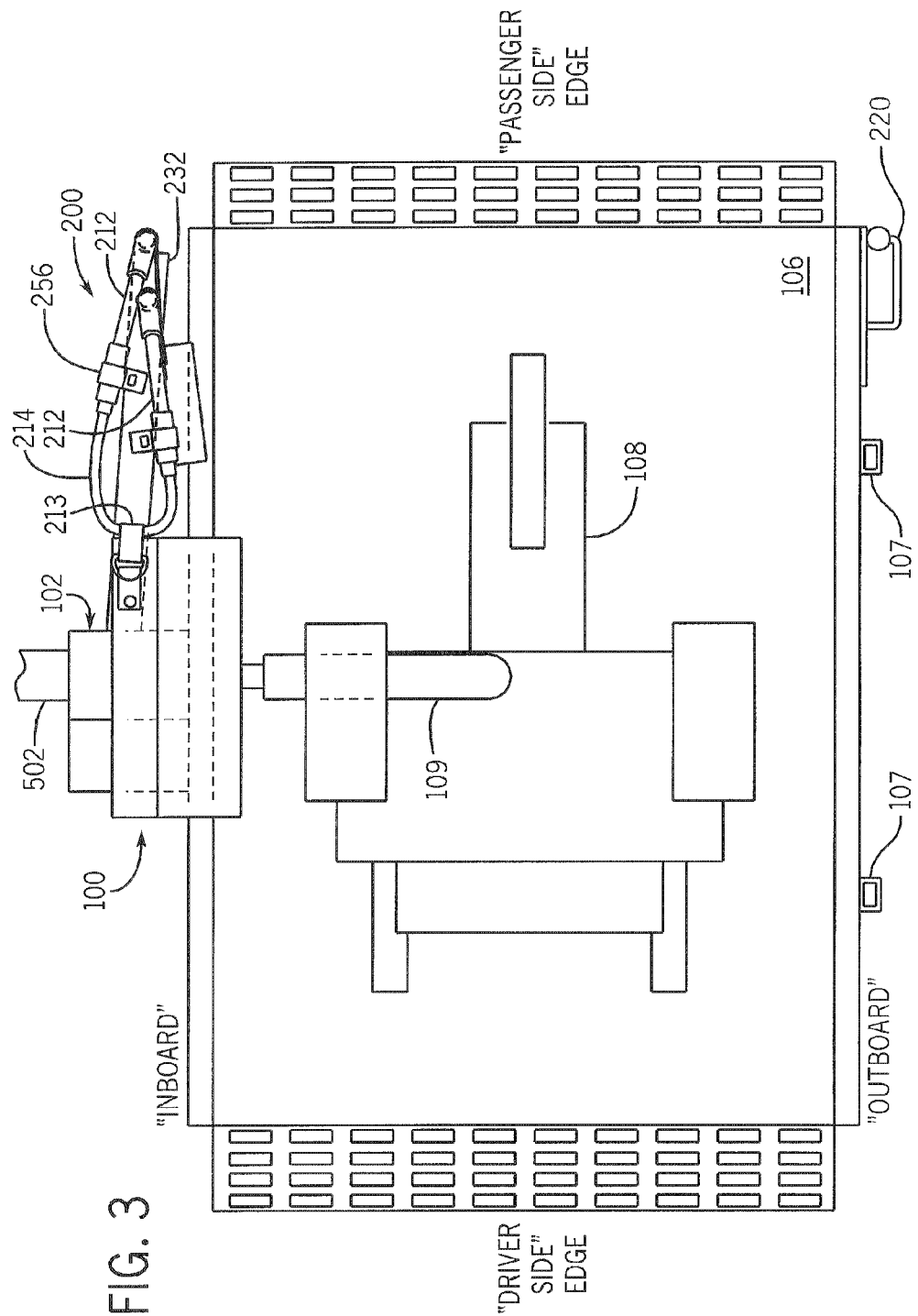
FIG. 3 is a top view of one or more embodiments of a storable exterior lift cover in its storage configuration.
Figure 4:
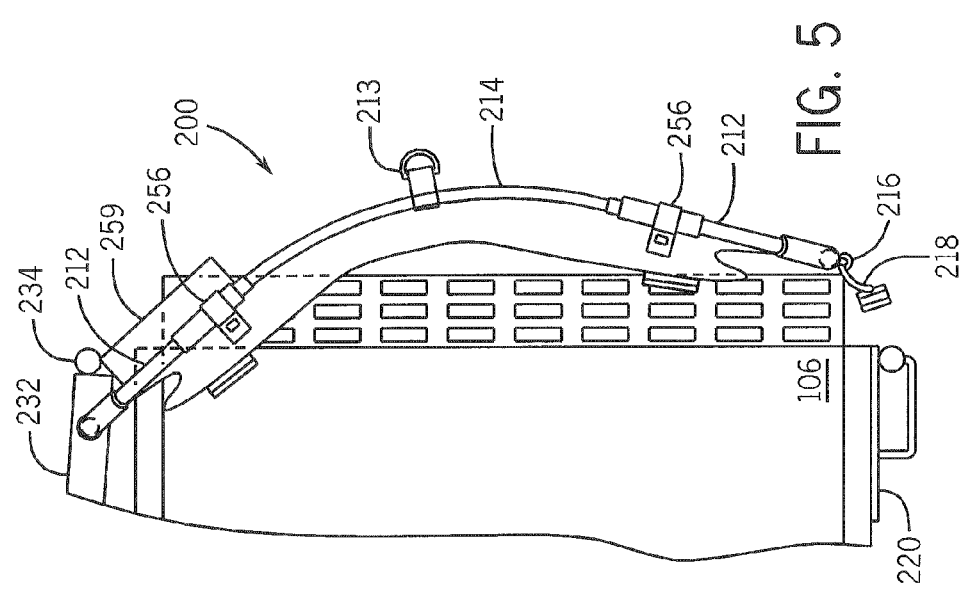
FIGS. 4 and 5 are top views illustrating unfolding/folding of one or more embodiments of a storable exterior lift cover.
Figure 5:
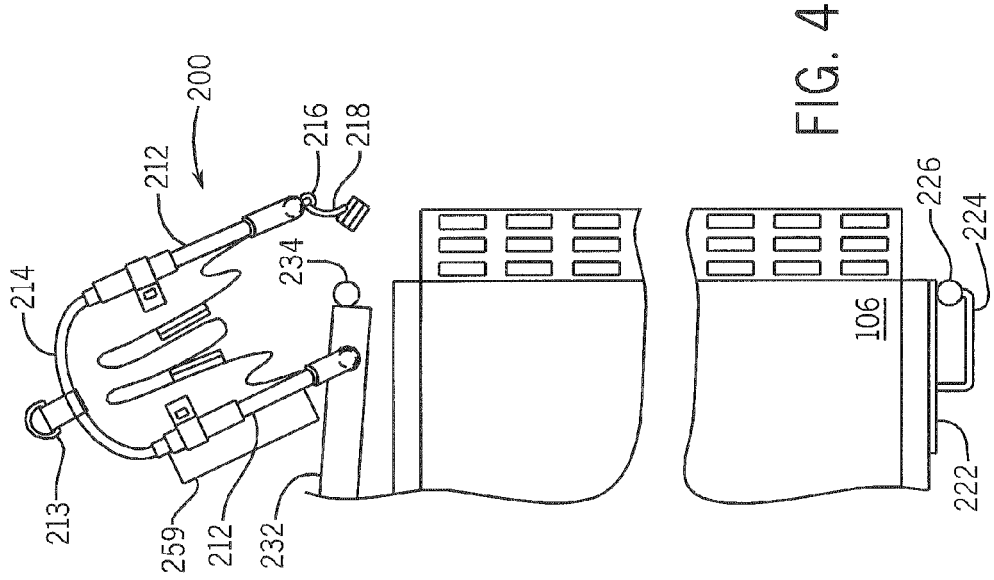

FIGS. 6-12 show frame 210 in its open configuration supporting end-sheet assembly 240. FIGS. 1-3 show the end-sheet cover assembly 240 in its folded, storage configuration, including end-sheet cover 242 generally enclosing and holding the top-sheet cover 252. A storage container such as a jacket 272, bag or the like can be put over the folded and stored covering apparatus 200 to further protect covering apparatus 200 during storage and transportation (jacket 272 can be kept in a storage pouch 259 or the like attached to end-sheet cover 242, for example. One or more Velcro straps 244 can be used to help secure covering apparatus 200 in its folded storage configuration, shown for example in FIG. 2, using a length of Velcro hooks and a length of Velcro loops. "Velcro" is a registered trademark for a well-known hook-and-loop fastening system. Any appropriate hook-and-loop fastener can be used wherever reference primarily made to Velcro fasteners herein.

FIGS. 1-12 show the covering apparatus 200 secured to a lift 100 attached to a motor vehicle 500. FIGS. 6-12 show the approximate positioning of a scooter or other PMV 108 on platform 106 when frame 210 is in its open configuration. Frame 210 is supported by and mounted to the frame mounting hole 238 and the inboard frame mounting cup 226 when frame 210 is in its folded configuration. Likewise, frame 210 is further supported by and mounted to the frame mounting hole 238 and the outboard frame mounting cup 234 when frame 210 is in its open configuration.

Figure 10:
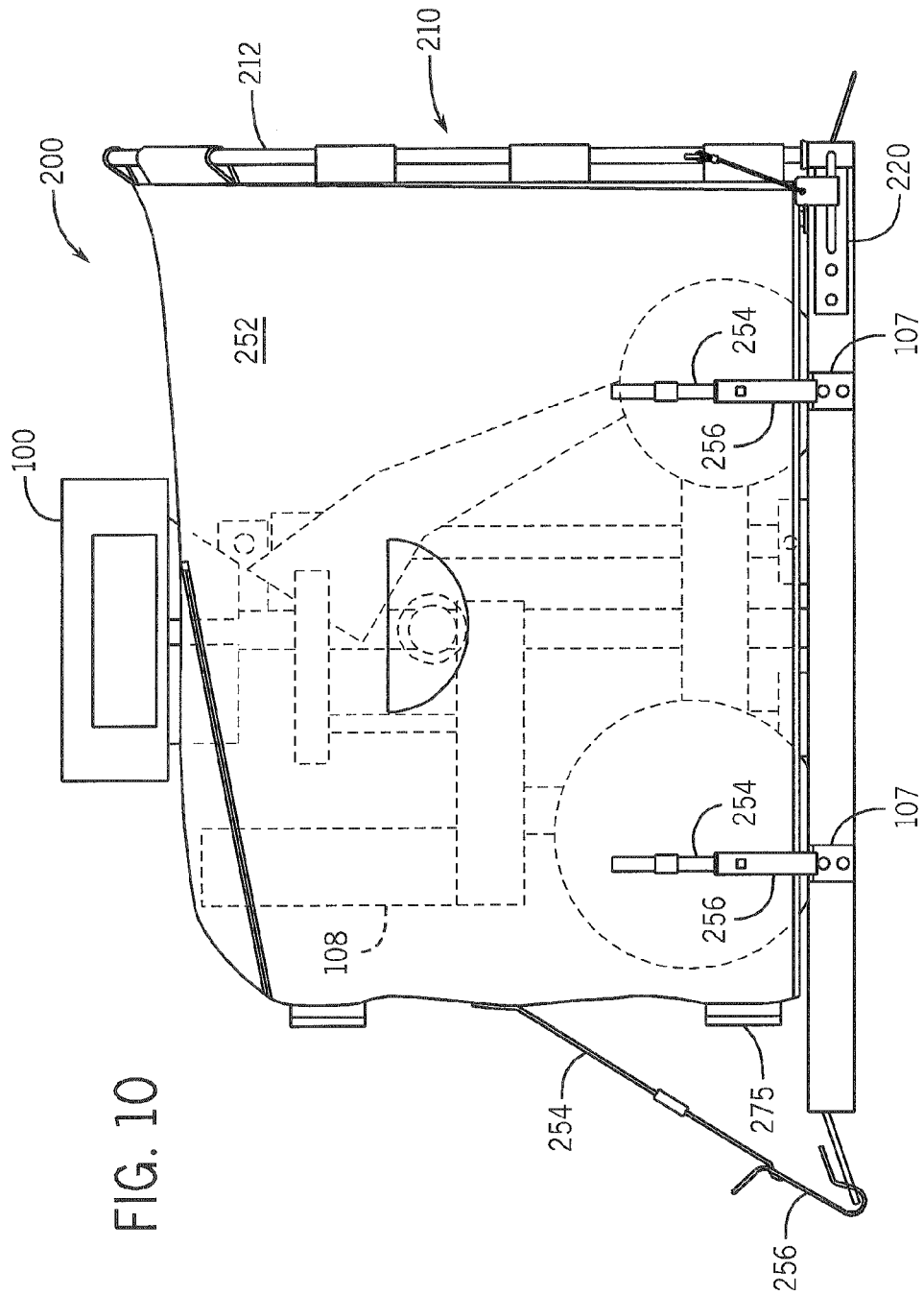
FIG. 10 is a side view of one or more embodiments of a storable exterior lift cover in its fully deployed configuration with a frame in its open configuration and the top-sheet cover assembly in its extended covering configuration.
Figure 11:
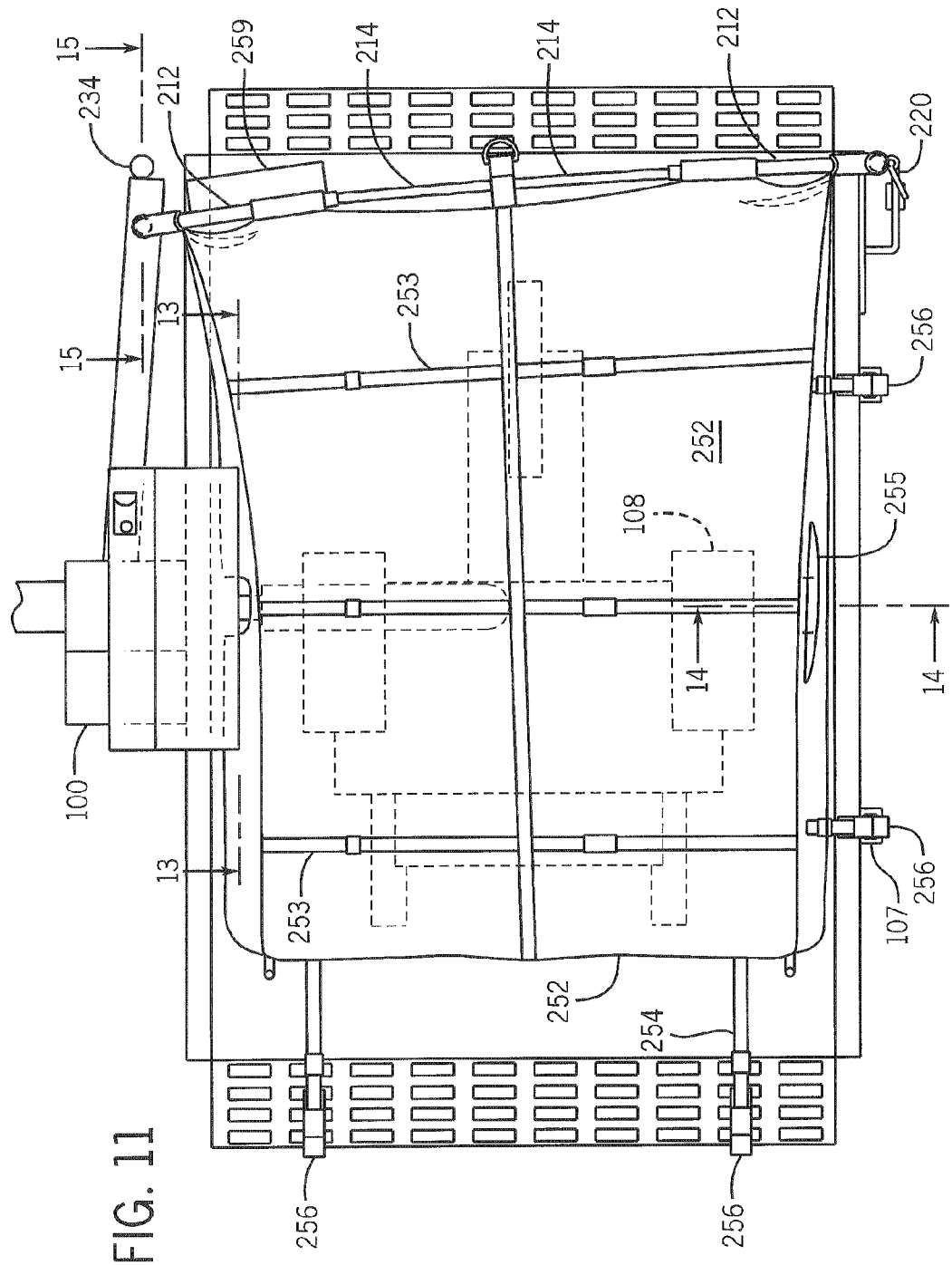
FIG. 11 is a top view of one or more embodiments of a storable exterior lift cover in its fully deployed configuration with a frame in its open configuration and the top-sheet cover assembly in its extended covering configuration.
Figure 12:
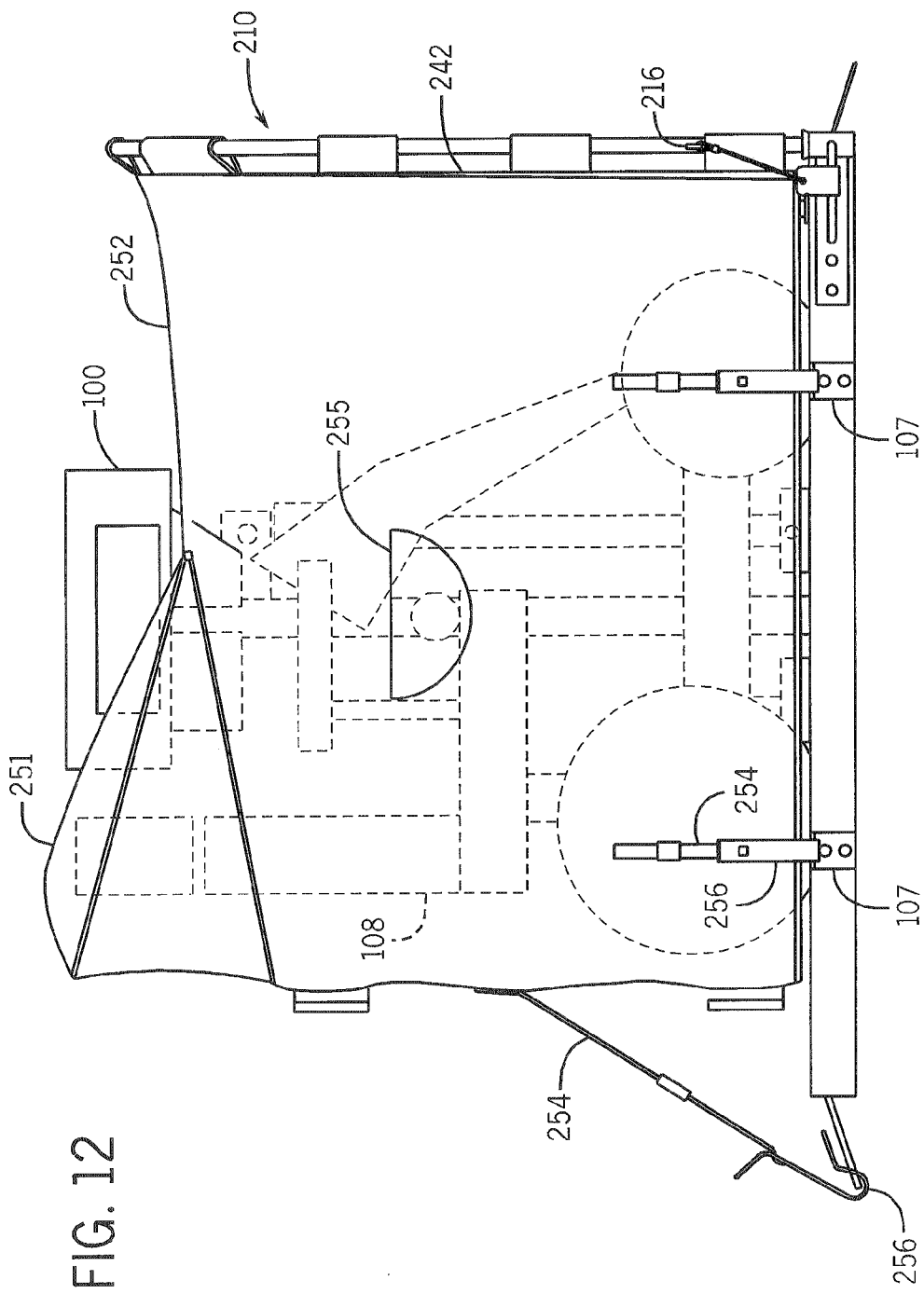
FIG. 12 is a side view of one or more embodiments of a storable exterior lift cover in its fully deployed configuration with a frame in its open configuration and the top-sheet cover assembly in its extended covering configuration.
Figure 13:
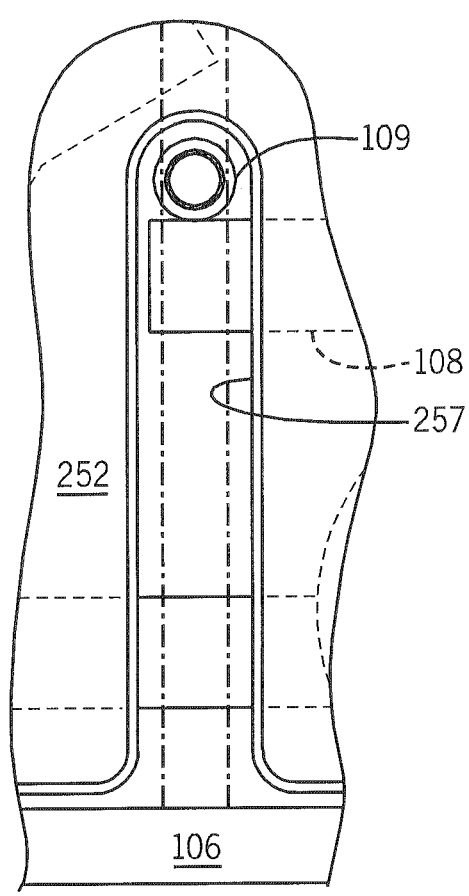
FIG. 13 is a cross-sectional view of a storable exterior lift cover taken along the line 13—13 of FIG. 11.
Figure 14:
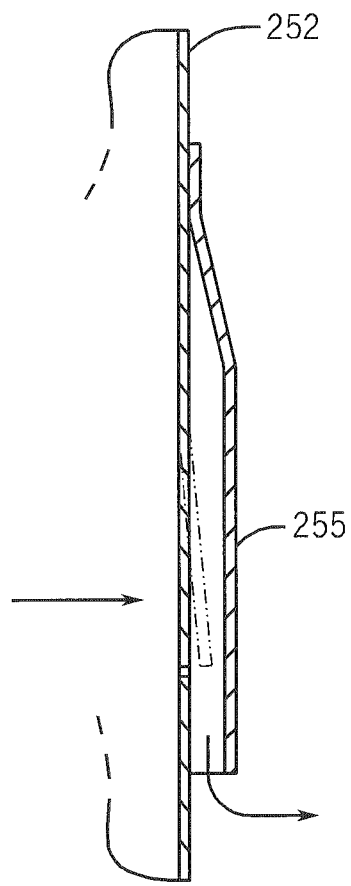
FIG. 14 is a cross-sectional view of a storable exterior lift cover taken along the line 14—14 of FIG. 11.

The Figures show the covering apparatus 200 in various stages of being deployed (or stored). FIGS. 10-12 show a fully deployed covering configuration with clips or hooks 256 of top-sheet cover assembly 250 securing the top-sheet cover fabric 252 to the platform 106 using straps 254, which can be adjustable. Hooks 256, such as that shown in FIG. 20, can be used on the driver side edge and, in some embodiments, on the outboard edge as well (using anchor brackets 107 affixed to platform 106 in some embodiments, as seen in FIGS. 10-12 and 18) to prevent flapping of the cover fabric 252 on sedans and other motor vehicles that generate more air flow across storable exterior lift cover 200. Air flow and wind also can be accommodated in some embodiments, as seen in FIGS. 11, 12 and 14 using one or more Venturi flaps or vents 255 in the cover fabric 252 (air flow being shown by the arrows in FIG. 14; each flap 255 can be covered to prevent rain and other fluids from entering via flap 255. Cover fabric 252 also can be provided with a slit 257 (in some embodiments being closable using Velcro fastening or the like) that accommodates one or more lift device components that extend over the platform (e.g., to assist in securing cargo thereon) such as a hold-down arm 109 or the like to secure a PMV 108, as seen for example in FIGS. 1, 3, 8, 13 and 21. Moreover, reflective markings, tape, etc. can be provided on top-cover 252 and/or other components of some embodiments to assist in improving visibility of the lift device and any cargo to other drivers.

Figure 6:
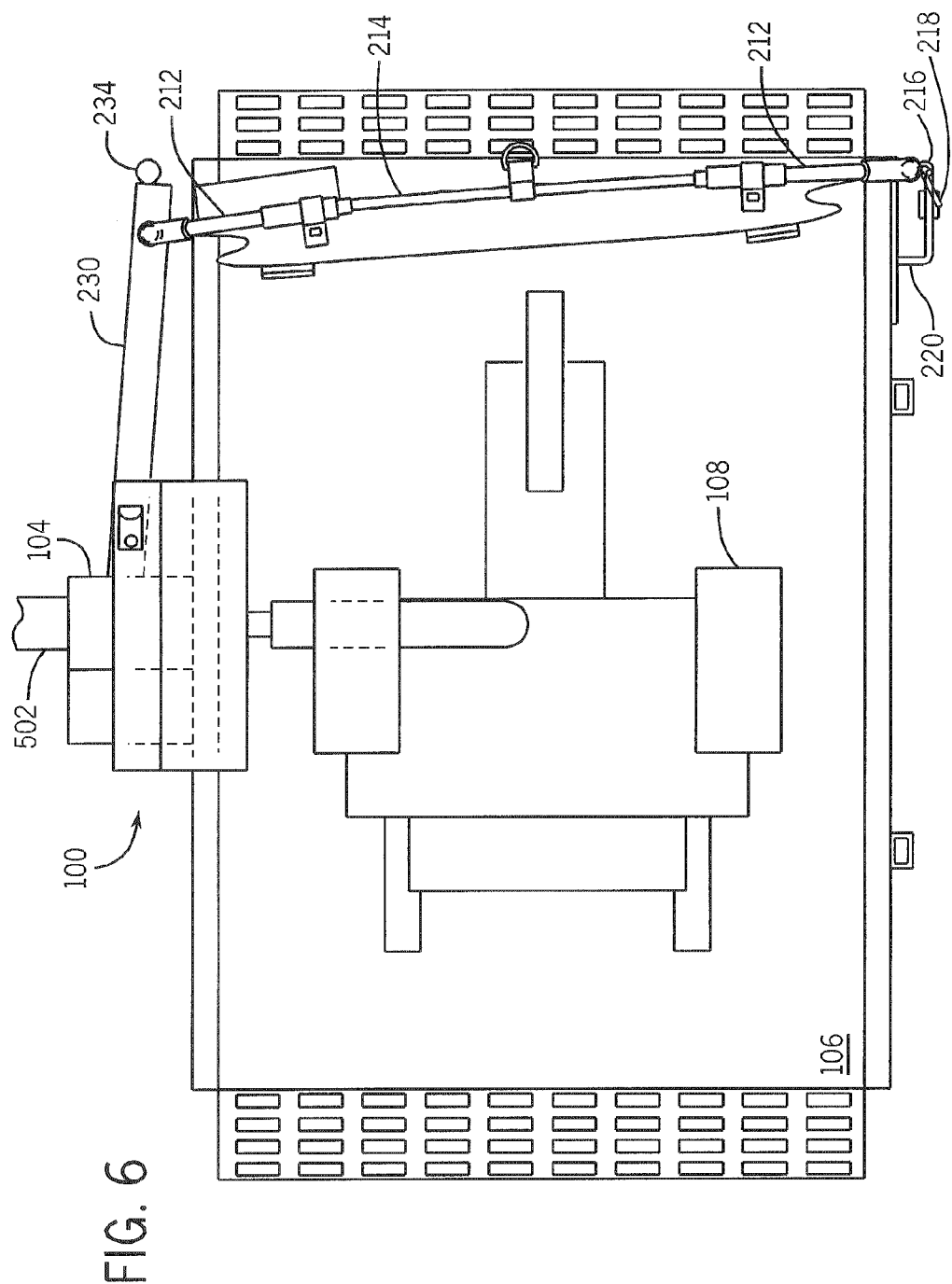
FIG. 6 is a top view of one or more embodiments of a storable exterior lift cover with a frame in its open configuration and the top-sheet cover assembly in its retracted storage configuration.
Figure 7:
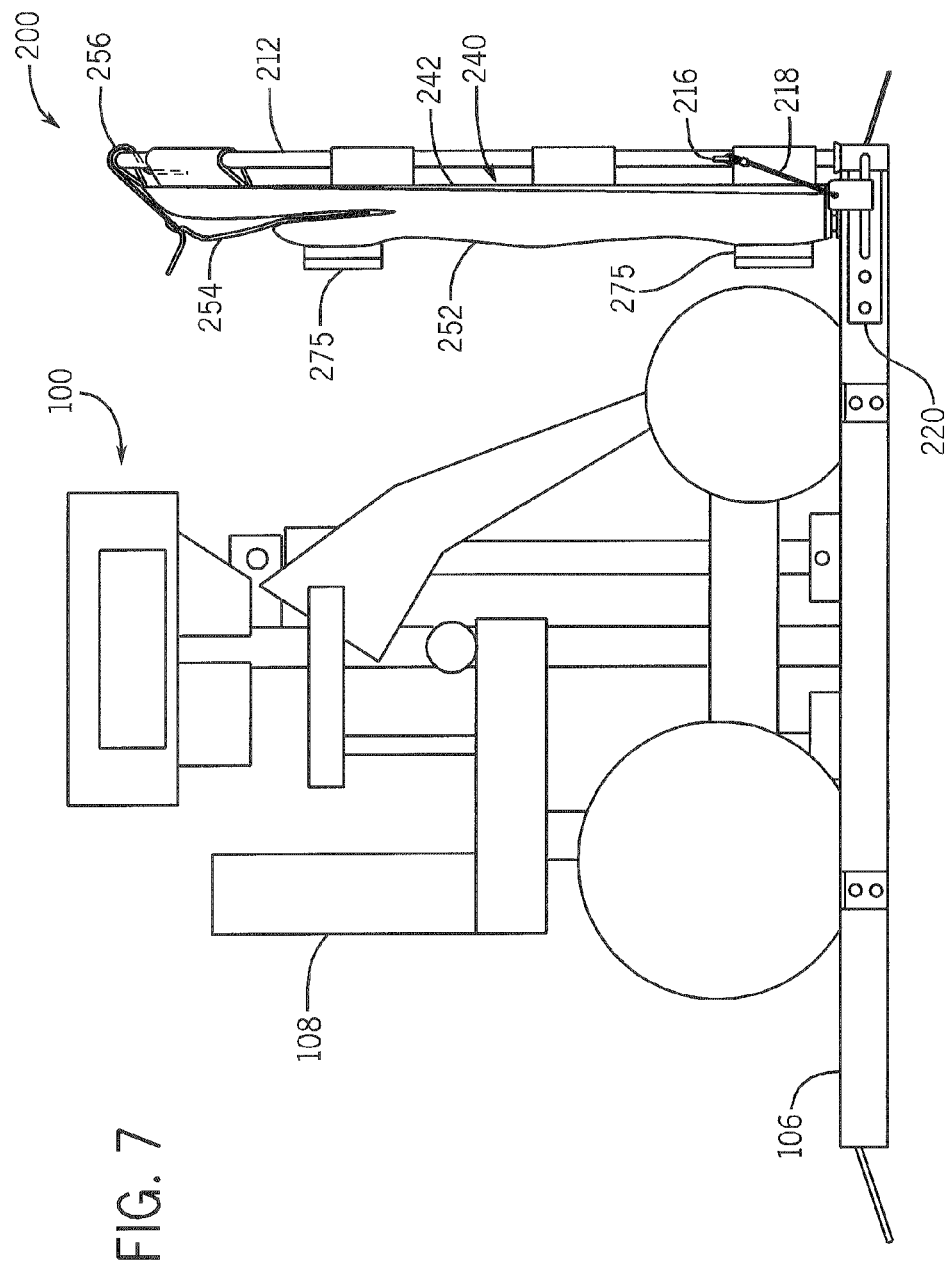
FIG. 7 is a side view of one or more embodiments of a storable exterior lift cover with a frame in its open configuration and the top-sheet cover assembly in its retracted storage configuration.

FIGS. 6 and 7 illustrate the top-sheet cover assembly 250 in its retracted configuration, with hooks 256 holding the top-sheet cover 252 to the frame members 212 using webbing straps 254. From this configuration, the frame members 212 can be folded as shown in FIGS. 3-6 to generally enclose and hold cover 252 for storage. FIGS. 3-6 show the sequential unfolding of the frame 210 using hole 238 and socket cup 234 of inboard mounting structure 230. In some embodiments, the frame 210 moves (by rotating the first frame member 212 using post 217 and frame support hole 238) from the folded configuration to the open configuration by rotating the frame 212 inboard (i.e., toward the motor vehicle) then outboard (i.e., away from the motor vehicle) to permit extension of the second frame member 212 to engage the outboard mounting cup 226.

As will be appreciated by those skilled in the art, end-sheet 242 and top-sheet 252 can be made of any suitable material, such as fabric, plastic, etc. Moreover, elastic can be added to either sheet 242, 252 to accommodate tall, long or otherwise larger PMVs, especially near the frame 210, which substantially maintains its position and configuration when the cover is fully deployed. Similarly, a headrest expansion panel 251 can be provided in sheet 252 to accommodate tall PMV headrests. Where the configuration of a PMV or other cargo does not maintain the top sheet 252 in a taut condition, adjustment straps 253 can be provided (e.g., to the top and driver sides of sheet 252) to allow sheet 252 to be cinched tight to prevent flapping and to reduce to risk of debris entering inside sheet 252. Excess length of straps 253 can be accommodated using Velcro fasteners or the like. Finally, to assist a user in pulling top sheet 252 securely over a PMV or other cargo, one or more handles 275 can be provided to facilitate pulling the sheet 252 tight (handles 275 can be brightly colored and located close to the driver side edge of sheet 252 to assist in locating such handles during deployment and storage operations).

In use, a stored covering apparatus 200 can be deployed as follows in some embodiments. The frame 210 is opened by removing one of the frame members 212 from inboard socket cup 234 and then pivoting and extending frame 210 by placing the frame member 212 into outboard socket cup 226. The outboard frame member 212 can then be secured to the lift platform 106 using a bungee connector 218 or the like. The retracted top-sheet cover 252 is then extended over the platform 106 and any PMV 108 on the platform 106 until the hooks 256 are secured to the driver side edge of platform 106. Straps 254 can be adjusted to provide an appropriate fit prior to moving the motor vehicle 500. To fold and store the covering apparatus 200, the reverse process is followed. Hooks 256 are disengaged from platform 106 and the top-sheet cover 252 is drawn back to its retracted configuration adjacent the end-sheet cover assembly 240. As seen in FIGS. 6 and 7, hooks 256 can be used to "hang" the top-sheet cover 252 from frame members 212. The folding process depicted sequentially in FIGS. 6, 5, 4 and 3 is then followed, including removing outboard frame member 212 from outboard socket cup 226 and placing it in inboard socket cup 234 as the covering apparatus 200 is rotated to a storage configuration.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A storable exterior lift cover system comprising:
   a storable exterior lift cover coupled to a motor vehicle lift device, the lift device comprising a platform coupled to a mast, wherein the lift device is configured to be mounted to a rear portion of a motor vehicle;
   an inboard mounting structure secured to an inboard mounting position on the lift device, the inboard mounting structure comprising a frame mounting support comprising a frame support hole and an inboard frame mounting cup;
   an outboard mounting structure secured to an outboard mounting position on the platform, the outboard mounting structure comprising an outboard frame mounting cup;
   a foldable frame comprising:
      first and second frame members;
      a flexible connector connecting the first and second frame members and configured to permit selective folding of the frame members;
      wherein the frame is movable between a folded configuration and an open configuration;
      wherein the frame is mounted to and supported by the frame support hole and the inboard frame mounting cup when the frame is in a folded configuration and further wherein the frame is mounted to and supported by the frame support hole and the outboard frame mounting cup when the frame is in an open configuration; and
   an end-sheet cover assembly secured to the frame and comprising an end-sheet made of pliable material that is generally vertical when the frame is in the open configuration;
   a top-sheet cover assembly secured to the frame, the top-sheet cover assembly comprising:
      a top-sheet cover made of pliable material secured to the frame and configured to generally cover the platform and any cargo thereon, the top-sheet cover being movable between a retracted storage configuration and an extended covering configuration; and
      one or more anchoring hooks secured to the top-sheet cover and configured to anchor the top-sheet cover to the platform when the top-sheet cover is in the extended covering configuration;
   wherein the storable exterior lift cover is in a fully deployed configuration when the frame is in the open configuration and the top-sheet cover assembly is in the extended covering configuration; and
   further wherein the storable exterior lift cover is in a storage configuration when the frame is in the folded configuration and the top-sheet cover assembly is in the retracted storage configuration.

2. The storable exterior lift cover system of claim 1 wherein the platform is pivotable between a generally horizontal loading position and a generally vertical storage position;
   further wherein the inboard mounting structure is mounted to the mast and is configured to keep the storable exterior lift cover clear of pivoting of the platform.

3. The storable exterior lift cover system of claim 1 wherein the top-sheet cover assembly further comprises one or more adjustment straps configured to tighten the top-sheet cover over the platform and any cargo thereon to reduce air flow through the top-sheet cover and/or flapping of the top-sheet cover.

4. The storable exterior lift cover system of claim 3 further comprising one or more Venturi vents in the top-sheet cover.

5. The storable exterior lift cover system of claim 1 wherein the frame further comprises anchoring means to secure the frame in the folded configuration to the mast.

6. The storable exterior lift cover system of claim 1 wherein, when the top-sheet cover assembly is in the retracted storage configuration, the one or more anchoring hooks are secured to the frame.

7. The storable exterior lift cover system of claim 1 wherein the top-sheet cover assembly comprises at least one of the following:
   one or more handles configured to allow a user to pull the top-sheet cover over the platform and any cargo thereon;
   a top-sheet cover slit configured to accommodate a lift device component that extends over the platform to assist in securing cargo thereon;
   an expansion panel configured to permit expansion of the top-sheet cover.

8. The storable exterior lift cover system of claim 1 wherein the first frame member is mounted to the frame support hole using a pin on the first frame member and a cotter pin holding the first frame member in the frame support hole;
   further wherein the second frame member is mounted to the inboard mounting cup when the frame is in the folded configuration and wherein the second frame member is mounted to the outboard mounting cup when the frame is in the open configuration.

9. The storable exterior lift cover system of claim 1 wherein the outboard mounting structure comprises a bungee connector configured to secure the second frame member to the outboard mounting structure.

10. The storable exterior lift cover system of claim 1 further comprising a jacket configured to enclose the frame, end-sheet cover assembly and top-sheet cover assembly when the storable exterior lift cover is in the storage configuration.

11. The storable exterior lift cover system of claim 1 wherein the frame moves from the folded configuration to the open configuration by rotating the frame inboard then outboard to permit extension of the second frame member to engage the outboard mounting cup.

12. The storable exterior lift cover system of claim 2 wherein the inboard mounting structure is coupled to an actuator in the lift mast so that the inboard mounting structure is raised and lowered when the platform is raised and lowered using the actuator, but further wherein the inboard mounting structure is not affected by pivoting of the platform.

13. A storable exterior lift covering apparatus comprising:
a frame mounted to a platform of an exterior lift and movable between a folded configuration and an open configuration;
an inboard mounting structure coupling the frame to an actuator of the exterior lift;
an outboard mounting structure mounted to the platform;
an end-sheet cover assembly comprising an end-sheet cover mounted to the frame;
a top-sheet cover assembly movable between a retracted configuration and an extended configuration, the top-sheet cover assembly comprising a top-sheet cover mounted to the frame and configured to be secured to the platform when the top-sheet cover assembly is in the extended configuration;
wherein the covering apparatus is in a fully deployed configuration in which the lift platform and any cargo thereon are generally covered when the frame is in the open configuration and the top-sheet cover assembly is in the extended configuration;
further wherein the covering apparatus is in a storage configuration when the frame is in the folded configuration and the top-sheet cover assembly is in the retracted storage configuration
further wherein the frame is supported by the inboard mounting structure and the outboard mounting structure when the frame is in the open configuration; and
further wherein the frame is supported only by the inboard mounting structure when the frame is in the folded configuration.

14. The storable exterior lift covering apparatus of claim 13 wherein the top-sheet cover comprises:
a Venturi vent configured to facilitate air flow through the top-sheet cover;
one or more adjustment straps configured to permit cinching of the top-sheet cover around the lift platform and any cargo thereon; and
a plurality of adjustable securing hooks configured to engage at least one of the following: the lift platform, an anchor bracket mounted to the lift platform.

15. The storable exterior lift covering apparatus of claim 14 wherein the covering apparatus in the storage configuration is configured to occupy space between an exterior lift device and a motor vehicle to which the lift device is mounted.

16. The storable exterior lift covering apparatus of claim 14 wherein the frame is configured to enclose and hold the top-sheet cover assembly within the end-sheet cover when the frame is in the folded configuration.

* * * * *